United States Patent [19]

von der Ohe

[11] Patent Number: 4,595,977
[45] Date of Patent: Jun. 17, 1986

[54] SWITCHED MODE POWER SUPPLY

[75] Inventor: Wilfried von der Ohe, Springe, Fed. Rep. of Germany

[73] Assignee: Telefunken Fernseh und Rundfunk GmbH, Hanover, Fed. Rep. of Germany

[21] Appl. No.: 671,044

[22] Filed: Nov. 13, 1984

[30] Foreign Application Priority Data

Nov. 12, 1983 [DE] Fed. Rep. of Germany ....... 3341074

[51] Int. Cl.⁴ ............................................. H02H 7/122
[52] U.S. Cl. ......................................... 363/56; 363/21; 361/100
[58] Field of Search .......................... 363/20, 21, 55, 56, 363/97; 361/93, 100, 18

[56] References Cited

U.S. PATENT DOCUMENTS

| 3,678,368 | 7/1972 | Popp | 363/55 |
| 4,316,242 | 2/1982 | Colangelo et al. | |
| 4,323,961 | 4/1982 | Josephson | 363/56 |
| 4,328,537 | 5/1982 | Schmidtner et al. | 363/21 |
| 4,410,935 | 10/1983 | Dang | 363/56 |
| 4,427,902 | 1/1984 | Hickman et al. | 363/56 |
| 4,447,841 | 5/1984 | Kent | 363/56 |
| 4,516,168 | 5/1985 | Hicks | 363/56 |
| 4,520,437 | 5/1985 | Boettcher, Jr. et al. | 363/56 |

FOREIGN PATENT DOCUMENTS

| 0096300 | 5/1983 | European Pat. Off. |
| 3220188 | 1/1983 | Fed. Rep. of Germany |
| 3323371 | 6/1983 | Fed. Rep. of Germany |
| 3303114 | 9/1984 | Fed. Rep. of Germany |

OTHER PUBLICATIONS

Article by R. Dangschat et al., "Ein Sperrwandler-Netzmodul mit Netztrennung", Funkschau 1975, No. 5, pp. 40-43.

Primary Examiner—Peter S. Wong
Assistant Examiner—Judson H. Jones
Attorney, Agent, or Firm—Spencer & Frank

[57] ABSTRACT

A switched mode power supply, particularly for a television receiver with standby operation, including a protection circuit for limiting the current on the primary side of the power supply transformer and preferably also a protection circuit against too high a voltage on the secondary side of the transformer. According to the invention, a further protection circuit including a thyristor is provided on the primary side so as to periodically block the switching transistor of the power supply oscillator when the current on the primary side becomes too high and exceeds the limit value.

14 Claims, 5 Drawing Figures

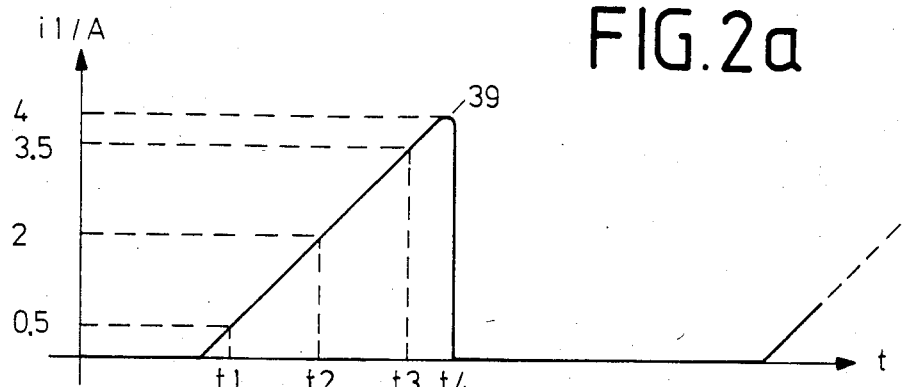
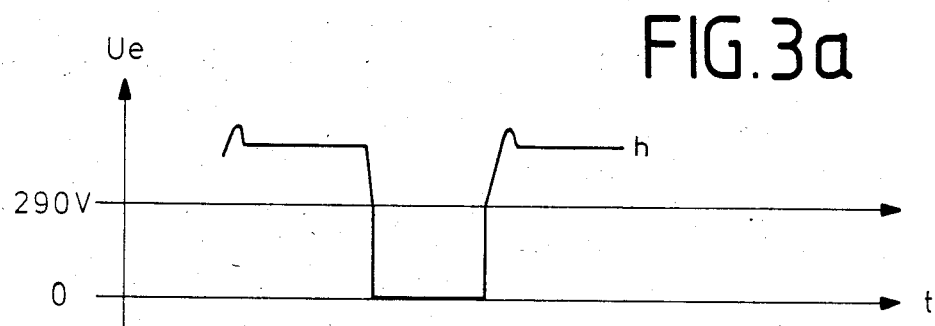

SWITCHED MODE POWER SUPPLY

BACKGROUND OF THE INVENTION

The present invention relates to a switched mode power supply, particularly for a television receiver. More specifically the present invention relates to a switched mode power supply which is provided with a protective circuit for limiting the current supplied to the primary winding of the power supply transformer.

In communications devices, such as, for example, a television receiver, it is known to generate the operating voltages required for the individual stages from the mains voltage by means of a switched mode power supply (for example see the article by R. Dangschat et al, "Ein Sperrwandlar-Netzmodul Mit Netztrennung", FUNKSCHAU, 1975, No. 5, pages 40–43). A switched mode power supply provides galvanic separation of the receiver circuits from the mains which is advantageous for the connection of external devices and for protectice insulation measures. Since a switched mode power supply operates at a frequency of about 30 KHz, which is high compared to the mains frequency, the separating transformer of the power supply serving to provide the galvanic separation can be designed substantially smaller and lighter in weight than a mains transformer for 50 Hz or 60 Hz. By providing a plurality of secondary windings or winding taps and rectifiers connected thereto, voltages of different magnitude and polarity can be generated on the secondary side of the separating transformer. A regulating circuit conventionally provided on the primary side of the transformer stabilizes the amplitude of these secondary voltages.

In a switched mode power supply, the amplitude of the current on the primary side and the amplitudes of the voltages on the secondary side are determined essentially by the above mentioned regulating circuit. If an error occurs in this regulating circuit, e.g. due to the failure of a component, the switched mode power supply may reached an undefined state and may generate unduly high currents on the primary side while producing unduly high voltages on the secondary side. This may endanger other components of the switched mode power supply and particularly the connected loads.

It is known to limit the primary current by connecting a limiter circuit including a Zener diode to the control electrode of a thyristor which controls the primary side switching transistor. The Zener diode limits the bias across the the control electrode of the thyristor and thus the maximum value of the primary current which depends on this bias. This protective circuit thus acts on the regulating circuit on the primary side. The proper operation of the regulating circuit and of the protective circuit thus depends on the proper behavior of various components. If one component, e.g. a coupling capacitor between the thyristor and the switching transistor, is not operational, the regulating circuit, and thus the protective circuit are no longer effective. The switched mode power supply may then reach an undefined state and may generate unduly high operating voltages on the secondary side.

SUMMARY OF THE INVENTION

It is the object of the present invention to overcome the above problem by providing simple protective circuits for a switched mode power supply which operates essentially independently of the proper state of the primary side components.

The above object is achieved according to the present invention by a switched mode power supply which generally comprises a rectifier having input terminals for connection to an alternating voltage supply, a seperating transformer having at least one main primary winding and at least one secondary winding, an output current regulated oscillator circuit connected to d. c. terminals of the rectifier, with the oscillator circuit including a switching transistor having its emittercollector path connected in series with the main primary winding and serving to periodically turn the primary current in the primary winding on and off, a first protective circuit means connected to the switching transistor for regulating and for normally limiting the primary current to a first predetermined value, and circuit means, including at least one rectifier connected to the secondary winding, for providing a d.c. operating voltage at an output terminal of the power supply; and which additionally is provided with: a second protective circuit means for limiting the primary current to a second predetermined value, which is greater than the first predetermined value, upon a malfunction of the first protective circuit means, with the second protective circuit means including a thyristor connected between the base of the switching transistor and a circuit point providing a blocking voltage for the switching transistor; and a second circuit means, including a threshold device, for connecting the control electrode of the thyristor to a point of reference voltage proportional to the primary current via the threshold device.

The solution according to the present invention thus offers the advantage that direct action is directed toward the base of the switching transistor which is not dependent on the regulating circuit. Switching off the switching transistor in order to prevent unduly high currents thus is effected independently of the operation of the regulating circuit and is thus also effective if components within the regulating circuit are malfunctioning. The circuit is relatively simple and requires essentially only one small additional thyristor.

In an advantageous combination with the known protective circuit for limiting the primary current wherein a breakdown diode, preferably a Zener diode, is additionally provided to connect the control electrode of a thyristor utilized for regulating the output current to the point of reference voltage proportional to the primary current, a specially power-free turn-off can be realized in the case of a malfunction because the Zener diode of the known protective circuit produces very fast switching without transient behavior. Power consumption is kept low because the known protective circuit and the protective circuit according to the invention become effective together in stages.

Finally, according to an advantageous modification of the invention, additional protection against excessive operating voltages generated on the secondary side can be realized by providing a secondary voltage overload protection circuit which generally includes a further thyristor, which is polarized in the forward direction for the current conducting phase of the switching transistor, connected to a further secondary winding of the transformer, and circuit means for applying the operating voltage at the power supply output terminal to the control electrode of the further thyristor to fire same when the operating voltage rises to a limit value. Such excessive voltages would otherwise be uncontrollable once the primary side regulating circuit is malfunctioning and could endanger the connected loads.

One embodiment of the invention will be described in greater detail with the aid of the drawings.

BRIEF DESCRIPTION OF THE DRAWINGS

FIG. 2 shows curves explaining the operation of the device for various operating modes and cases of malfunction.

FIG. 3 is a curve explaining the operation of the circuit of FIG. 1 with the use of the protective circuit under discussion here.

DETAILED DESCRIPTION OF THE PREFERRED EMBODIMENT

Figure 1:
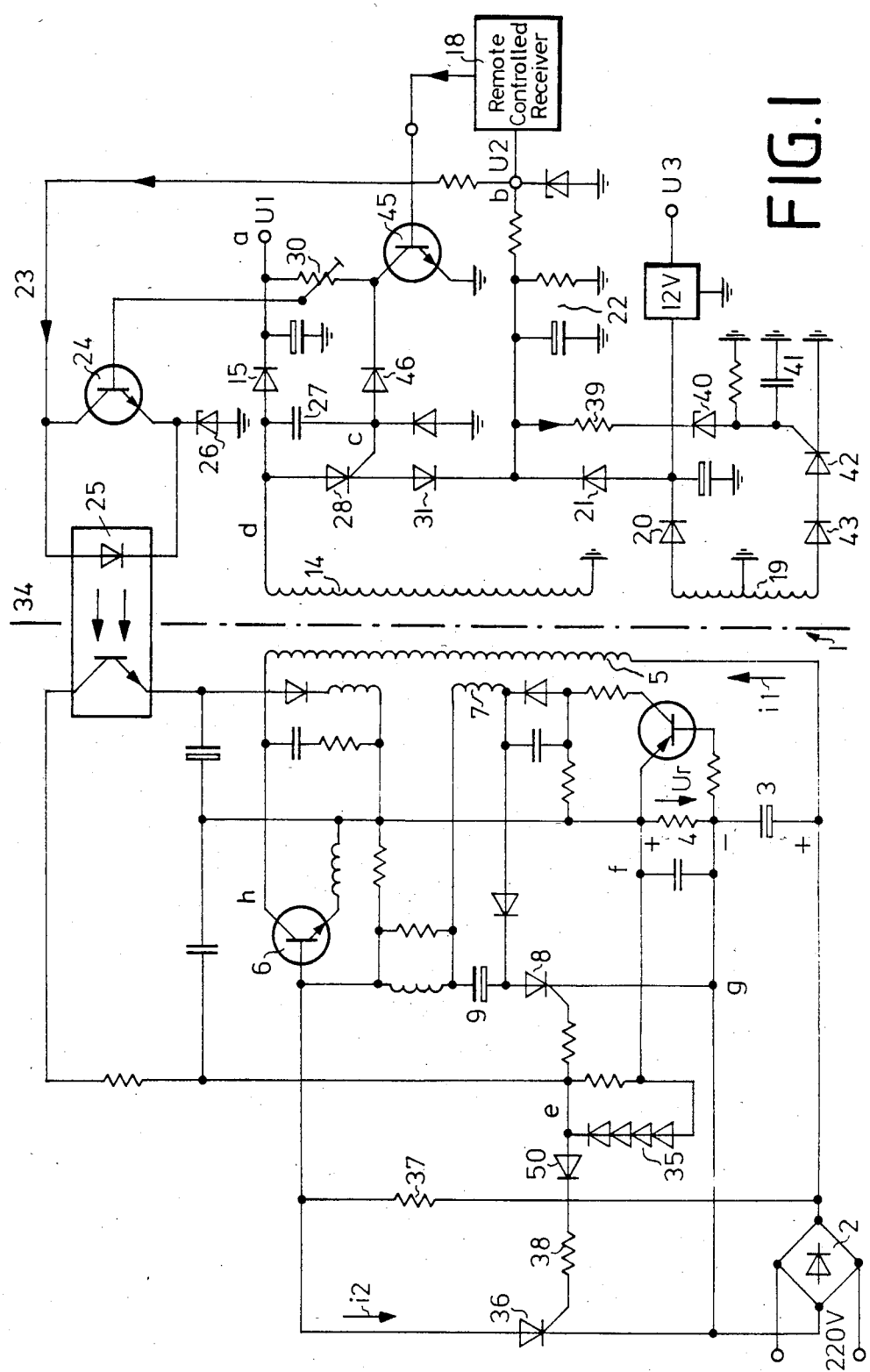
FIG. 1 is a circuit diagram of a preferred embodiment of a switched mode power supply according to the present invention.

Referring now to FIG. 1, there is shown the schematic circuit diagram of a preferred embodiment of a switched mode power supply for use with a remote controlled television receiver. The switched mode power supply includes a number of basic components which are connected together on the primary side of a separating transformer 1 in a conventional manner to form a current regulated oscillator circuit. In particular, the components on the primary side of the separating transformer 1 include a mains rectifier 2 whose input terminals are connected to an alternating current main, e.g. 220 v, a charging capacitor 3 connected across the output terminals of the rectifier 2, a current measuring resistor 4 which is connected in series with the main primary winding 5 of the transformer 1 and the emitter-collector path of a switching transistor 6 across the output terminals of the rectifier 2, a feedback winding 7 of transfomer 1 which serves to produce oscillation, and a thyristor 8 and a coupling capacitor 9 which are connected between the base of switching transistor 6 and one output terminal of rectifier 2 (point g), with the thyristor 8 serving to periodically turn off the transistor 6 so as to regulate the output current. For this purpose, the control electrode of thyristor 8 is connected to the terminal of resistor 4 (point f) which is not connected to the output of rectifier and is thus responsive to the voltage across the resistor 4 which in turn is proportional to the current il flowing in the primary winding 5.

On its secondary side, the transformer 1 is provided with two secondary windings 14 and 19 to which are connected, in a conventional manner, rectifiers and charging capacitors so as to provide desired operating voltages. More specifically, via a rectifier 15, the secondary winding 14 normally furnishes an operating voltage U1 of +150 v across terminal a, while secondary winding 19 furnishes, via rectifier 20, diode 21, RC member 22, a second operating voltage U2 (about 5–10 v) across terminal b for the remote control receiver 18, and a further operating voltage U3 via rectifier 20. The dot-dash line 34 indicates the point of galvanic separation between mains and receiver circuit.

As indicated above, the switched mode power supply of FIG. 1 is primarily intended for use with a remote controlled television receiver, and consequently it is desirable to provide some arrangement for reducing the output voltages provided by the power supply when the receiver is in a standby condition. For this purpose, an additional circuit is provided which includes an optocoupler 25 whose output is connected to the oscillator circuit on the primary side of transformer 1 and whose input is connected in parallel with the emitter-collector path of a transistor 24 and between the output terminal b for the operating voltage U2 and ground via a Zener diode 26. The base of transistor 24 is connected to the center tap of a potentiometer 30 which is connected between the output terminal a for the operating voltage U1 and the collector of a transistor 45 whose emitter is connected to ground and whose base is connected to an output of remote receiver 18. Finally a thyristor 28 is connected in series with a diode 31 between the secondary winding 14 (point d) and output terminal b and the control electrode of thyristor 28 is connected to point d via capacitor 27 and to the collector of transistor 45 via a diode 46.

The various operating modes for normal operation, standby operation and malfunction of the switched mode power supply circuit thus far described, as well as the remaining protection and regulating circuits will now be decribed below.

Normal Operation

During normal operation, the circuits on the primary side of transformer 1 function in the conventional manner. On the secondary side of transformer 1, operating power to the circuit including transistor 24, optocoupler 25 and Zener diode 26 is supplied via line 23 from terminal b. The output of optocoupler 25 influences the primary side in such a manner that the full rated power is transmitted and the operating voltages U1, U2, U3 have their rated values. Potentiometer 30 provides a regulating voltage proportional to U1, which voltage acts on the primary side via transistor 24 and optocoupler 25 and serves to stabilize the operating voltages generated on the secondary side. Remote control receiver 18 provides an output voltage to the base of transistor 45 which renders it conductive. Point c is thus short circuited to ground via conductive transistor 45 and conductive diode 46, so that the pulse voltage appearing across point d does not trigger thyristor 28 via its control electrode. Thyristor 28 is thus without influence, and diode 31, which is provided for decoupling, is blocked.

Standby Operation

During standby operation, the remote control receiver 18 furnishes no voltage to the base of transistor 45, causing same to be blocked and rendered nonconductive. This causes the voltage at the center tap of potentiometer 30, and thus at the base of transistor 24, to increase. This causes the transistor 24 to become fully conductive and short circuit the optocoupler 25. Optocoupler 25 therefore transmits no energy to the primary side. Thus the primary side is switched in such a manner that only the power required for standby operation is transmitted and the operating voltages generated on the secondary side decrease. U1 drops from +150 V to +15 V. At the same time, the blocking of transistor 45 caused point c to be disconnected from ground. Thus positive pulses appearing at point d reach the control electrode of thyristor 28 via capacitor 27 so that the latter is fired periodically. Thyristor 28 acts as a controlled rectifier and generates, via conductive diode 31, an operating voltage across terminal b by rectifying the lower pulse voltage present across terminal d; this operating voltage serves to feed remote control receiver 18. The likewise reduced operating voltage across the output of rectifier 20 which would be too small to control the remote control receiver 18, is decoupled from point b by diode 21. A circuit as thus far described for normal and standby operation is disclosed in Federal Republic of Germany Patent Application No. P 33 23 371, which in turn is an application of addition to Federal Republic of Germany Patent Application No. P 33 03 114, published Aug. 9, 1984.

Prior Art Protective Circuit

As mentioned above, regulation of the amplitude of the current i1 and the amplitudes of the operating voltages U1, U2 and U3 is effected by changing the bias across the control electrode of thyristor 8. Thyristor 8 is fired by voltage Ur across resistor 4. To increase the operating voltages, the regulating circuit shifts the bias across the control electrode of thyristor 8, i.e. at point e, in a negative direction. Then voltage Ur across resistor 4 and current i1 must take on higher values to change the voltage at point e in the positive direction until the moment thryistor 8 is fired. To limit the bias across point e in the negative direction, and thus the maximum current il, it is known to provide a protective circuit including a diode 35 connected between circuit points e and f. With this circuit, point e can become negative compared to point f by no more than −2.8 V, so that the final value of current il is limited. As shown, diode 35 is a stacked diode of type BZ 102 2V8 including four individual diodes and having a forward voltage of 2.8 V. Diode 35 may also be replaced by a Zener diode which would then have to be polarized differently. Moreover, a normal diode, e.g. of type 1N 4148 can be used as diode 35. If a component malfunctions in the regulating circuit, e.g. coupling capacitor 9 or thyristor 8, this protective circuit formed by diode 35 is no longer effective. The primary current i1 and the generated operating voltages U1, U2 and U3 may then take on unduly high values and may endanger the other components and connected loads.

Additional Current Protection Circuit

To overcome the above problem with the known protective circuit, according to the basic concept of the present invention an additional protection circuit including thyristor 36, resistor 38 and diode 50 is provided. As shown, the thyristor 36 is connected between the base of transistor 6 and the point g of the circuit, i.e., a point in the circuit which provides a blocking voltage for the transistor 6. The control electrode of thyristor 36 is connected via the series connection of the resistor 38 and the diode 50 to the circuit point e. The operation of this additional protective circuit will be described in connection with FIG. 2.

FIG. 2a shows the primary current i1 which increases periodically and is switched off by transistor 6. During standby operation, current i1 reaches a maximum value of no more than 0.5 A and is turned off each time at time t1. During normal operation, current i1 reaches a final value of 2A each time and is turned off each time at time t2. If current i1 reaches an unduly high value of 3.5 A due to a fault in the circuit or due to other influences such as too high a power consumption, the protective circuit including diode 35 responds so that the current i1 is switched off at time t3 and cannot take on any higher values. If this protective circuit is no longer effective, current il initially reaches a higher value of 4 A, which corresponds to a voltage Ur of 4 V across measuring resistor 4. With such a voltage value of Ur, diode 35 causes diode 50, which serves as an additional threshold element, to become conductive so that control thyristor 36 is fired by way of its control electrode and resistor 38. Firing of thyristor 36 causes the generation of the pulse-shaped current i2 shown in FIG. 2b, which blocks transistor 6 in the desired manner and prevents i1 from reaching an unduly high value. Thus current i2 according to FIG. 2b is repeated periodically with the turn-on frequency of current il. The combination of the protective circuit including thyristor 36 with the protective circuit including diode 35 provides an inexpensive circuit, because diode 35 is utilized simultaneously for both protective circuits. The two protective circuits supplement one another also in the sense that power consumption is low and a power loss is substantially prevented in that the current i1 is switched off over a rounded curve as indicated by the numeral 39 in FIG. 2a.

Overvoltage Protection Circuit

Even if the primary side operates properly with respect to current consumption and energy transfer, the operating voltages appearing at the secondary side may become too high since these also depend on the connected load. Voltage U1 with its rated value of 150 v may then take on values of 300 v so that the high voltage generated in a television receiver and the like becomes unduly high. Therefore, an additional overvoltage protective circuit including resistor 39, Zener diode 40, capacitor 41, thyristor 42 and diode 43 is provided on the secondary side. More specifically, the secondary winding 19 is provided as a grounded center tap winding, and the diode 43 and the thyristor 42 and connected in series between the free end of winding 19 and ground. The control electrode of the thyristor 42 is connected to ground via the capacitor 41 and to the output terminal b via the series connection of the Zener diode 40 and the resistor 39. With this additional overvoltage protection circuit, if the operating voltages lie within permissible limits, Zener diode 40 is blocked by operating voltage U2, so that thyristor 42 remains blocked and has no influence on winding 19. Alternatively, if the operating voltages take on an unduly high value, voltage U2 controls Zener diode 40 to become conductive and reaches the control electrode of thyristor 42, so that the latter becomes conductive. Thyristor 42 and diode 43 are polarized in the forward direction for the current conducting phase of i1 and therefore constitute a preliminary load for transformer 1. This caues feedback winding 7 to be practically short-circuited so that the switched mode power supply oscillates only at very low amplitude and thus transmits hardly any power. Such a circuit is disclosed in detail in Federal Republic of Germany DE-OS No. 3,220,188, published Dec. 1, 1983.

Diode 43 and capacitor 41 of FIG. 1 have the following additional advantageous effects. Diode 43 prevents the alternating voltage directed in the blocking direction from moving from winding 19 to thyristor 42. Therefore, in the case of a malfunction, i.e., if voltage U2 acts on the control electrode of thyristor 42, the thyristor 42 will remain continuously conductive. Due to the structure of a thyristor, a positive voltage is present across the control electrode of a conductive thyristor. This voltage is stored by means of capacitor 41 (e.g. 100 $\mu$F) so that thyristor 42 remains conductive until the next period. The protective circuit thus is advantageously set up for operational malfunctions during which only small voltage and current pulses appear. In such operation, only a power of 1 W is taken up from the mains, so that this type of operation can remain in effect as long as desired without any noticeable heating up of the components. Capacitor 41 thus acts as a storage element for a voltage which keeps thyristor 42 advantageously conductive in the sense of the above described protection against over voltages.

FIG. 3a shows the pulse voltage at point h, i.e. at the collector of switching transistor 6, during normal operation. During the current conducting phase, this voltage is practically zero, with point g being considered the primary ground point having the potential of zero. The voltage drop across measuring resistor 4 here remains unconsidered.

FIG. 3b shows the conditions with use of the overvoltage protective circuit 39–43 in question. Now there is only a very slight flow of current pulses i1 at a frequency of 100 kHz, so that the voltage across point h drops only slightly. During this operation, there is practically no more pulse operation and only a minimum amount of power of about 1 W is taken over from the mains. The circuit has now settled into a malfunction state and can remain in this condition for any desired period of time without endangering components or involving an undesirably high power consumption from the mains. This status is relinquished only after the device connected to the mains terminals has been turned off and on again.

It will be understood that the above description of the present invention is susceptible to various modifications, changes and adaptations, and the same are intended to be comprehended within the meaning and range of equivalents of the appended claims.

What is claimed is:

1. In a switched mode power supply including a rectifier having input terminals for connection to an alternating voltage supply; a separating transformer having at least one main primary winding and at least one secondary winding; an output current regulated oscillator circuit connected to d.c. terminals of said rectifier, with said oscillator including a switching transistor having its emitter-collector path connected in series with said main primary winding and serving to periodically turn the primary current in said primary winding on and off; first protective circuit means connected to said switching transistor for normally limiting said primary current to a first predetermined value; and circuit means, including at least one rectifier and connected to said at least one secondary winding, for providing a d.c. operating voltage at an output terminal of said power supply; the improvement comprising: a second protective circuit means for limiting said primary current to a second predetermined value, which is greater than said first predetermined value, upon nonoperation of said first protective circuit means, said second protective circuit means including a thyristor connected between the base of said switching transistor and a circuit point providing a blocking voltage for said switching transistor, and second circuit means, including a threshold device, for connecting the control electrode of said thyristor to a point of reference voltage proportional to said primary current via said threshold device; further comprising: a third protective circuit means connected to said secondary winding for limiting said d.c. operating voltage, when said operating voltage rise to a limit value.

2. A switched mode power supply as defined in claim 1 wherein said circuit point comprises one of the output terminals of said rectifier.

3. A switched mode power supply as defined in claim 1 further comprising a current measuring resistor disposed in the current path of said primary current and having one end connected to the terminal of said thyristor connected to said circuit point and its other end connected to said control electrode of said thyristor via said threshold device.

4. A switched mode power supply as defined in claim 1 wherein said threshold device is a diode.

5. A switched mode power supply as defined in claim 4 wherein said diode is a Zener diode.

6. A switched mode power supply as defined in claim 4 wherein said threshold device includes a plurality of series connected diodes.

7. A switched mode power supply as defined in claim 4 further comprising a circuit means for regulating said primary current including a further periodicaly fired thyristor connected to control the switching of said switching transistor and having its control electrode connected to said point of reference voltage; and wherein: said first protective circuit means includes a threshold element for additionally connecting said control electrode of said further thyristor to said point of reference voltage; and, said threshold device of said second protective circuit means includes said threshold element of said first protective circuit means.

8. A switched mode power supply as defined in claim 7 wherein said threshold device of said second protective circuit means comprises said threshold element of said first protective circuit means and a further threshold element connected between said control electrode of said thryristor and the end of said threshold element of said first protective circuit means which is connected to said control electrode of said further thyristor.

9. A switched mode power supply as defined in claim 1 further comprising: a further secondary winding for said separating transformer; a second thyristor, which is polarized in the forward direction for the current conducting phase of said switching transistor, connected to said further secondary winding; and further circuit means for applying said operating voltage provided at said output terminal of said power supply to the control electrode of said second thyristor to fire said second thyristor when said operating voltage rise to a limit value.

10. A switched mode power supply as defined in claim 9 further comprising a diode polarized in the forward direction for the current conducting phase of said switching transistor connected between said further secondary winding and said second thyristor.

11. A switched mode power supply as defined in claim 10 wherein said further circuit means further includes a capacitor disposed between said control electrode of said second thyristor and the ground on the secondary side of said transformer.

12. A switched mode power supply as defined in claim 10 wherein the self-capacitance of said second thyristor is utilized to provide a capacitor disposed between said control electrode of second thyristor and the ground on the secondary side of said transformer.

13. A switched mode power supply as defined in claim 10 wherein said further circuit means further includes a Zener diode disposed between said operating voltage output terminal and said control electrode of said second thyristor, with said Zener diode breaking down when said operating voltage rises to said limit value.

14. A switched mode power supply as defined in claim 9 wherein said further circuit means further includes a Zener diode disposed between said operating voltage output terminal and said control electrode of said second thyristor, with said Zener diode breaking down when said operating voltage rises to said limit value.

* * * * *